Figure 1:
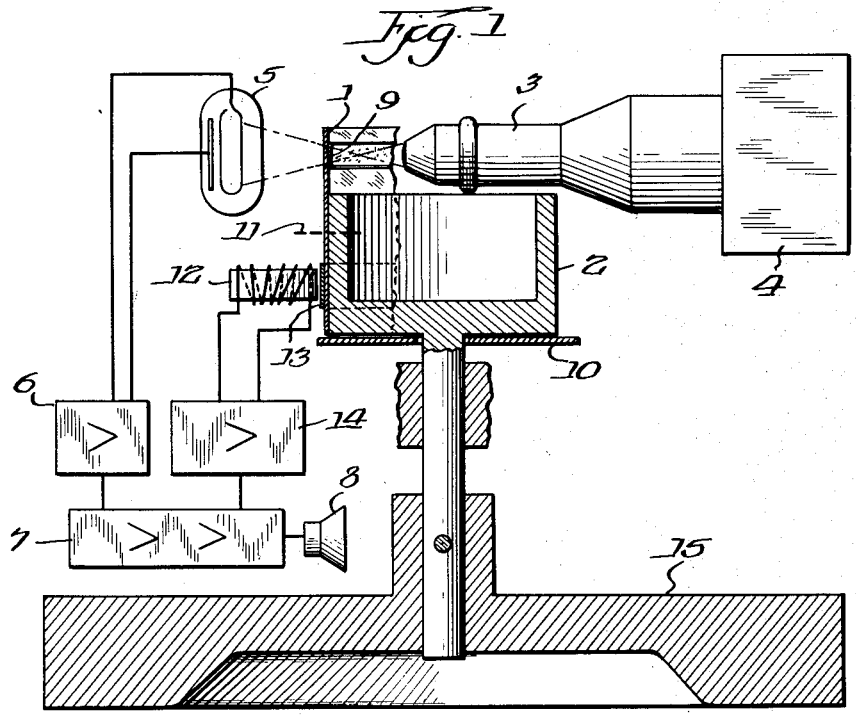

Sept. 6, 1955         H. FRIESS         2,717,283
SOUND FILM APPARATUS AND THE LIKE
Filed June 19, 1951

Inventor:
Hans Friess.
By

United States Patent Office 2,717,283
Patented Sept. 6, 1955

2,717,283

SOUND FILM APPARATUS AND THE LIKE

Hans Friess, Karlsruhe-Daxlanden, Germany, assignor to Klangfilm Gesellschaft mit Beschraenkter Haftung, Berlin and Karlsruhe, Germany, a German corporation Application June 19, 1951, Serial No. 232,251

Claims priority, application Germany August 7, 1950

17 Claims. (Cl. 179—100.3)

This invention relates to sound film apparatus, and is particularly concerned with sound film player or reproduction apparatus which is constructed and arranged for scanning optically recorded as well as magnetically recorded sound tracks.

The invention provides for this purpose side by side, transverse of the film, suitable optical scanning or pickup means and magnetic scanning or pickup means, respectively. In the case of an optical film, the optically activated layer carrying the sound track may be arranged to face the film guide and transport elements, and the optical scanning means may therefore be positioned to scan the film upon the side thereof which faces these elements. In the case of a magnetic sound film the magnetically activated layer carrying the sound track may be disposed on the outside, and the magnetic scanning means may accordingly be positioned to scan the film upon the outside thereof. The position of the pickup or scanning means relative to the sides of the film may be reversed, depending on the type of film employed and on the position of the sound tracks thereon.

The invention in its principle therefore provides for two scanning or pickup means which act upon the opposite sides or surfaces of the film.

The invention is primarily intended to provide apparatus for the selective exchangeable scanning or pickup of optical and magnetic sound track carriers, respectively. The scanning or pickup means of the apparatus may, however, be operated jointly, for example, in conjunction with a film carrying an optical as well as a magnetic sound track.

It has been proposed to provide for the film transport in optical sound apparatus a guide reel coacting with a balancing or stabilizing mass and to arrange the optical scanning or pickup means peripherally of the reel. The motion of the film is stabilized by the balancing mass, and the scanning or pickup takes place at the point where the film moves most quietly and evenly.

It is one of the objects of the invention to employ the advantages of such a stabilizer film path in reproduction or player apparatus for the scanning or pickup of optical sound tracks as well as magnetic sound tracks. The magnetic sound track scanning or pickup means, i. e., the magnetic head, may accordingly be also arranged at the stabilized film path. Such arrangement, however, may in some cases lead to difficulties so far as the space utilization is concerned, and as a consequence thereof it may be necessary to increase the size of the guide reel and of the balancing mass.

These difficulties are avoided by scanning the film from opposite sides thereof, and the invention thus permits utilization of and operation with customary guide reels and balancing masses as used in previously proposed apparatus of the noted type.

A particularly suitable embodiment of the invention provides the scanning means in coaction with the guide reel side of the film or within the guide reel, and disposes the magnetic head on the outside thereof. The film is inserted in such a manner, that the active layer of the optical sound track faces the guide reel while the magnetic sound film is inserted in reverse position so that the magnetic layer faces the outside. The guide reel axis may in such arrangement extend in vertical direction so that the two scanning means or devices are positioned in vertically superposed relationship.

Another object and feature of the invention is to provide a sound film player device for selectively playing films of different kinds, for example, perforated standard films, narrow films, or split standard films. The film guide and transport elements are accordingly arranged for selectively accommodating and transporting films of different width. The invention contemplates to provide, in addition, adjustable edge guide means for the film, which may be positionally adjusted in accordance with the width of the film that may at any time be used.

Still another object is to provide for the optical scanning and for the magnetic scanning means a common amplifier having a frequency characteristic which is in suitable manner fitted for coaction with the scanning means. It may be desirable in some cases to employ separate pre-amplifiers with different frequency characteristics for coaction with a common principal amplifier. For the optical scanning there is suitably provided amplifier means having a linear frequency characteristic, and for the magnetic scanning there is provided amplifier means which includes suitable frequency correction (anti-distortion) for the raising of the lower tones because, incident to the scanning in the magnetic procedure, the obtained sound voltage is known to rise proportional to the frequency.

The objects outlined in the foregoing and additional objects and features will be brought out in the course of the detailed description which will presently be rendered with reference to the accompanying drawings. In these drawings, Fig. 1 shows in diagrammatic manner, partially in sectional view, an embodiment of the invention, for example, of a re-play device, which may be adapted for cutting and mixing operations, in which the axis of the guide reel extends in vertical direction; and Fig. 2 illustrates the arrangement in diagrammatic elevational plan view with some parts in section.

Like parts are indicated by like reference numerals.

Figure 2:
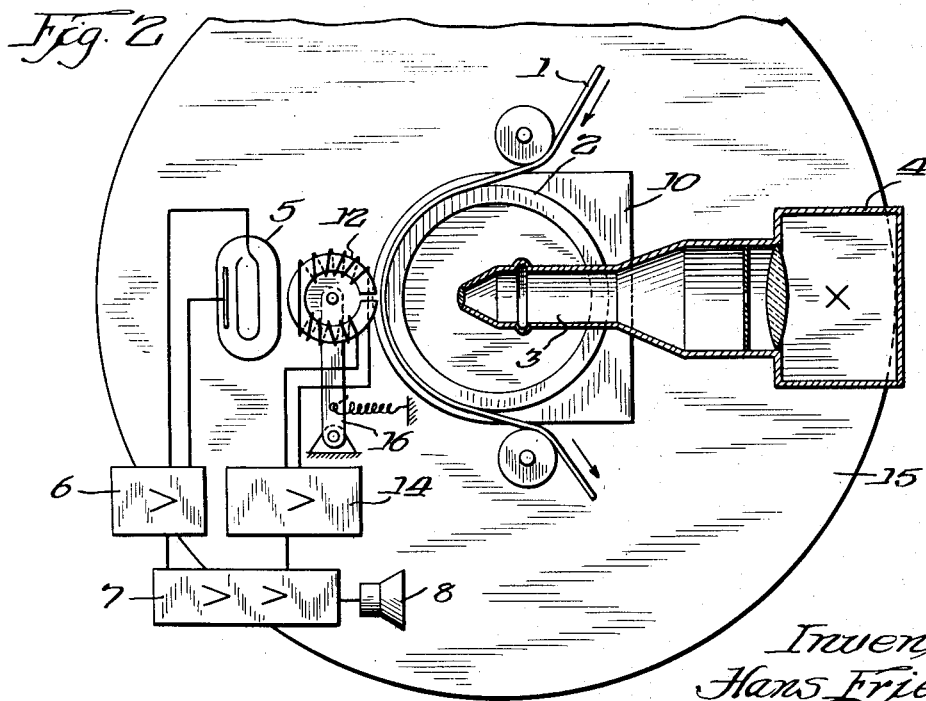

Referring now to the drawings, the film 1 is guided over the guide reel 2 (film-stabilizing path) which is provided with a relatively large stabilizing or balancing mass 15 shown in sectional view at the bottom of Fig. 1. The scanning of the optical track takes place by means of the optical device 3. The light source is disposed in the casing 4. The gap reproduction as well as the conversion of light oscillations into sound frequency currents takes place in known manner over the photosensitive cell 5, the sound frequency currents being amplified in the pre-amplifier 6 and being conducted therefrom to the loudspeaker 8. The film 1 is in this case assumed to be a positive having an active layer which is disposed on the inside facing the guide reel 2 and the light source contained in the casing 4. The optical track 9 is disposed on the film 1 near the upper edge thereof. At its lower edge the film 1 is held in its correct position by the edge guide 10. Incident to the playing of a standard 35 mm. film, the edge guide is disposed at the bottom, that is, at the lower edge of the guide reel 2, as shown in Fig. 1.

The edge guide means 10 may be a suitable member or members disposed for coaction with the edge of the film and may be made adjustable by suitable and approved means so that it can be shifted transverse of the film, for example, into the dotted-line position 11 shown in Fig. 1, disposing it upwardly by one-half of the film width. Suitable means may be employed for adjusting the edge guide, for example, worm or screw means coacting with a fixed structural part to shift the guide into a desired position and to secure it in such adjusted position, or suitable cam means arranged for angular displacement relative to the edge guide so as to move it into a wanted position, if desired, against the pressure of a suitable restoring spring or the like. Lever or knob means may be used for operating the adjusting means. When the edge guide is adjusted and fixed in the desired position, for example, position 11, the device may be used with so-called split films of 17.5 mm. width.

The idler rollers coacting with the guide reel 2, as well as the remaining film guide and transport rollers, are of course suitably constructed and arranged so as to accommodate films of different width.

The optical scanning of narrow films may be carried out in similar manner, provided that care is taken to adjust the edge guide 10 in the proper corresponding position and to fix it in such position.

In accordance with the invention, there is provided for the magnetic scanning a magnetic head 12 which is disposed outside of the film 1 for coaction therewith underneath the optical scanning device 5. As viewed transversely of the film, both scanning devices are therefore disposed side by side. The magnetic layer 13 does not face inwardly in the direction of the reel 2, as in the case of the optical track 9, but faces outwardly away from the guide reel. A magnetic film therefore is, in accordance with the invention, inserted in a position which is the reverse of the position of an optical film. In the case of a combination film, the two active layers are disposed upon opposite sides of the film.

The magnetic head 12 may be carried by a pivotally mounted spring-biased lever 16 as indicated in Fig. 2.

For the amplification of the sound frequency currents produced in the magnetic head 12, there may be used, if desired, the same pre-amplifier 6 which also serves for coaction with the optical scanning device. However, in such a case there may be required an adjustable frequency correction (anti-distortion) for the raising of the low tones. As shown in Figs. 1 and 2, there may be provided a separate pre-amplifier 14 for coaction with the magnetic scanning device so that only the principal amplifier 7 and the reproducer, which may be a loudspeaker 8, are in common. The pre-amplifiers 6 and 14 distinguish in the described embodiment, so far as their frequency characteristics are concerned.

The edge guide means indicated at 10 and 11 are preferably the same for the playing of split magnetic sound films and for optical films. If desired, two separate edge guides may be employed, one for either edge of the film. One edge guide such as 10 will thereby limit the lower edge, and another edge guide such as 11 the upper edge of the film. One of the edge guides may be stationary and the other may be adjustable, for example, in the case of narrow films, the edge guide such as shown at 11 may be adjustable in the manner already described.

The invention presents particular advantages, especially for use with cutting tables or film reproduction and player apparatus in which the picture and the sound are initially upon separate strips and are processed by cutting, mixing, proofreading or the like. The invention may of course also be used in conjunction with projectors in motion picture theaters.

It may be mentioned also that the invention is not limited to the feature of providing the two scanning devices peripherally directly at or along the guide reel 2. These scanning devices may be disposed differently, for example, ahead of or in back of the guide reel. The respective and magnetic scanning points may in such arrangements also be provided in superposed relationship or alongside one another transverse of the film.

What is believed to be new and desired to have protected by Letters Patent of the United States is pointed out in the appended claims.

I claim:

1. Sound film apparatus comprising guide means for transporting a film, an optical scanning device, a magnetic scanning device, means for disposing said optical scanning device so as to scan a film transported by said guide means for reproducing sound from an optical sound track carried thereby on one side thereof, and means for disposing said magnetic scanning device alongside said optical scanning device as viewed in a direction transverse to said film so as to scan a film transported by said guide means for reproducing sound from a magnetic sound track carried thereby on the other side thereof.

2. The apparatus as defined in claim 1 wherein said optical scanning device and said magnetic scanning device are arranged for selective scanning of optical sound films and for magnetic sound films, respectively.

3. The apparatus as defined in claim 1, comprising a reel which constitutes said film guide means, a stabilizing mass coacting with said reel, said magnetic and said optical scanning devices being disposed peripherally of said reel alongside one another as viewed axially of said reel.

4. The apparatus as defined in claim 1, comprising a reel which constitutes said film guide means, a stabilizing mass coacting with said sound reel, said magnetic and said optical scanning devices being disposed peripherally of said reel alongside one another as viewed axially of said reel, said optical device being operative upon the film in a direction facing the inside of said reel and said magnetic scanning device being operative upon the film outside of said reel.

5. The apparatus as defined in claim 1, comprising a reel which constitutes said film guide means, the axis of said reel extending vertically, said scanning devices being positioned in vertically superposed relationship.

6. The apparatus as defined in claim 1, together with auxiliary film guide means, said film guide means and said auxiliary film guide means being adapted to accommodate films of varying width including standard films, narrow films and split films.

7. The apparatus as defined in claim 1, comprising adjustable edge guide means for guiding films of varying width.

8. The apparatus as defined in claim 1, comprising separate pre-amplifier means for coaction with said optical and said magnetic scanning means, respectively, the pre-amplifier means for said optical scanning means having substantial linear frequency characteristics and that for the magnetic scanning means having frequency control for raising lower tones.

9. The apparatus as defined in claim 8, comprising a common amplifier coacting with said pre-amplifiers, and a loudspeaker disposed at the output of said common amplifier.

10. The apparatus as defined in claim 1, comprising a motion-stabilizing mass cooperating with said film guide means.

11. The apparatus as defined in claim 1, wherein the axis of said film guide extends vertically, said scanning means being disposed in vertically superposed relationship outside a line drawn parallel to the peripheral transverse plane of said film guide means.

12. The apparatus as defined in claim 1, comprising means for coaction with said film guide means for guiding therealong films of varying width.

13. The apparatus as defined in claim 1, comprising optical means for coaction with said light-tone scanning means.

14. The apparatus as defined in claim 1, wherein said film carries an optical sound track on the side thereof which faces said film guide means and a magnetic sound track on the side thereof which faces away from said film guide means.

15. The apparatus as defined in claim 1, for use alternately with films carrying optical sound tracks and magnetic sound tracks, respectively.

16. The apparatus as defined in claim 1, wherein said optical scanning device is operatively effective on a film guided over said film guide means at a point lying axially outside of said guide means and wherein said magnetic scanning device is operatively effective on a film guided over said guide means at a point lying radially of said guide means outside thereof.

17. The apparatus as defined in claim 1, comprising separate amplifier means for said optical and said magnetic scanning devices, respectively, a common amplifier for said separate amplifier means, and a reproducer device controlled by said common amplifier.

References Cited in the file of this patent

UNITED STATES PATENTS

| | | |
|---|---|---|
| 2,480,162 | Rath | Aug. 30, 1949 |
| 2,493,056 | Bartelson | Jan. 3, 1950 |
| 2,517,440 | Kleber | Aug. 1, 1950 |
| 2,564,312 | Rossmann | Aug. 14, 1951 |
| 2,605,364 | Masterson | July 29, 1952 |